(12) United States Patent
Asao

(10) Patent No.: US 7,423,711 B2
(45) Date of Patent: Sep. 9, 2008

(54) DISPLAY APPARATUS

(75) Inventor: Yasufumi Asao, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 10/552,578

(22) PCT Filed: Jul. 30, 2004

(86) PCT No.: PCT/JP2004/011310

§ 371 (c)(1),
(2), (4) Date: Aug. 9, 2006

(87) PCT Pub. No.: WO2005/012987

PCT Pub. Date: Feb. 10, 2005

(65) Prior Publication Data

US 2007/0052911 A1      Mar. 8, 2007

(30) Foreign Application Priority Data

Aug. 1, 2003     (JP)     ............... 2003-285441

(51) Int. Cl.
*G02F 1/1335* (2006.01)
(52) U.S. Cl. ............... 349/113; 349/5; 349/112; 349/156
(58) Field of Classification Search ............ 349/5, 349/7, 8, 14, 67, 84, 112, 113, 156, 193, 349/201; 385/901
See application file for complete search history.

(56) References Cited

U.S. PATENT DOCUMENTS

| | | | | |
|---|---|---|---|---|
| 5,353,133 A * | 10/1994 | Bernkopf | ........................ | 349/5 |
| 5,420,706 A | 5/1995 | Yamazaki et al. | ............. | 359/67 |
| 6,005,651 A * | 12/1999 | Takahara et al. | ............. | 349/137 |
| 6,236,799 B1 * | 5/2001 | Huh et al. | .................... | 385/147 |
| 6,939,013 B2 | 9/2005 | Asao | ........................... | 353/98 |
| 7,055,968 B2 | 6/2006 | Asao | ........................... | 353/98 |
| 2001/0004279 A1 | 6/2001 | Sako et al. | ................... | 349/158 |
| 2002/0171619 A1 | 11/2002 | Gordon, II et al. | .......... | 345/107 |
| 2003/0048521 A1 | 3/2003 | Ikeda et al. | .................. | 359/296 |
| 2005/0225703 A1 * | 10/2005 | Stephenson et al. | ......... | 349/113 |
| 2006/0017750 A1 | 1/2006 | Asao | ........................... | 345/690 |

FOREIGN PATENT DOCUMENTS

JP     2000-201802     7/2000     ............ 385/113 X

\* cited by examiner

*Primary Examiner*—Brian M Healy
(74) *Attorney, Agent, or Firm*—Fitzpatrick, Cella, Harper & Scinto

(57) ABSTRACT

A display apparatus includes first and second oppositely disposed substrates, at least one of which is a transparent substrate, a display layer, disposed between the first and second substrates, for being placed in an optical state switchable between a light transmission state and a light interruption state, for each of a plurality of pixel units, and a reflection surface provided on the first substrate. A scattering layer is disposed on the second substrate opposite to the first substrate, and a structure is disposed at a boundary portion between adjacent pixels on the first substrate. The structure is a light absorption structure absorbing not less than 60% of incident light.

11 Claims, 12 Drawing Sheets

DISPLAY APPARATUS

TECHNICAL FIELD

The present invention relates to a reflection type display apparatus which is particularly provided with a scattering plate.

PRIOR ART

A conventional reflection type display apparatus utilizing external light features low power consumption when compared with a self emission type display device or a display device including a backlight, and has been used for various applications such as a portable electronic equipment. Further, with respect to the reflection type display apparatus, structures for effecting bright display have been reported from various research institutes.

Of these structures, a device structure using a scattering plate can realize a device structure by simply using a mirror reflection electrode, so that an inexpensive and high display quality reflection type display apparatus is expected to be realized, and development thereof proceeds.

The scattering plate is, e.g., a film-like member having a light scattering layer having a property of scattering substantially all the incident light toward its moving direction side. By disposing the scattering plate on the display layer on its light incidence side, a degree of diffusion of incident light is controlled by utilizing the property of forward scattering. This scattering plate is generally used in combination with a display layer as a shutter device capable of switching an optical state of the incident light between transmission and non-transmission states and a mirror reflection member disposed behind the display layer (Japanese Laid-Open Patent Application No. 2000-201802).

In order to apply the above described scattering plate type device as a display device, it is necessary to optimize its scattering performance. For example, in the case of very weak scattering property, reflected light is very bright in a regular (specular) reflection direction with respect to an incident light source and is not substantially observed in observing positions other than the regular reflection position. As a result, a very dark display state is observed in almost all the observing positions.

On the other hand, in the case where the scattering property is very strong, it becomes difficult to maintain the above described "property of scattering substantially all the incident light toward its moving direction side", so that the light is also scattered in a direction opposite from the moving direction of the incident light, i.e., scattered backward. In this case, even when the display layer as the shutter device can provide a very high contrast, the high contrast cannot be realized by the influence of the scattering plate having a strong scattering property. Accordingly, in the case of using the scattering plate, design of the scattering plate such that it has an optimum scattering performance is indispensable.

However, a conventional reflective display device using such a scattering plate is accompanied with a problem such that display blur at an image peripheral portion essentially occurs even when any optimization is performed.

This display blur will be described with reference to FIGS. 12-14.

FIG. 12 shows a structure of a typical reflective display device using the scattering plate. In FIG. 12, only the case where straight light is incident from a point (light) source is considered for the sake of simplicity.

Referring to FIG. 2, when light 14 emitted from the point source enters a forward scattering plate 11, from an air medium, as a film-like scattering plate having a forward scattering function, the light 14 is first refracted in accordance with Snell's law to reach a forward scattering layer 11a of the forward scattering plate 11. The light 14, after being scattered or diffused by the forward scattering layer, reaches a display layer 12. At this time, diffused lights (light rays) are indicated by lines 15 to 17. Of these lines, a solid line 16 corresponds to a light ray in the case of absence of the forward scattering layer 11a. In the case where the forward scattering plate 11 is disposed, an amount of light rays indicated by the solid line 16 becomes largest. Further, alternate long and short lines 15 shows a maximum range in which the light 14 is diffused by the forward scattering layer 11a in a counterclockwise direction in the drawing. A chain double-dashed line 17 shows a maximum range in which the light 14 is diffused by the forward scattering layer 11a in a clockwise direction in the drawing. The respective light rays described above, after passing through the forward scattering layer 11a and the display layer 12, reach a mirror reflection layer 13.

The respective light rays which have reached the mirror reflection plate 13 have a property of being regularly reflected, so that they are reflected with loci as indicated by the lines in FIG. 12. The thus reflected respective light rays again pass through the display layer 12 and are diffused by the forward scattering layer 11a to be emitted outward.

When the light rays are emitted outward along the loci shown in FIG. 12, such a state that a range indicated by a reference numeral 25 appears to be shinning is observed by an observer as shown in FIG. 13. When the display layer 12 is controlled so as to provide an image display state as shown in FIG. 14, i.e., white display in a range 37, black display in a range 38, and white display in a range 39, a range 35 is observed by the observer such that it is shinning by the light 14 emitted from the point source as described with reference to FIG. 13.

Similarly, with respect to the light reaching the mirror reflection plate 13 in the range 39, the observer observes that it is shinning in the range 36 shown in FIG. 14. In other words, the observer cannot observe the black state in the range 38 shown in FIG. 14.

A pixel pitch in FIG. 14 is very small, so that the black display cannot be realized but when the pixel pitch is somewhat larger than that in FIG. 14, the black display can be realized. However, in this case, the resultant display image is accompanied with edge blur. As a result, particularly in the case where an image with a sharp edge or a black line on a white background is displayed by using the forward scattering plate 11a, display blur is caused to occur.

In order to solve this problem, it has been conventionally tried to find out a condition for compatibly realizing a reduction in display blur and a high display performance by optimizing a scattering performance of the forward scattering plate itself. In addition thereto, there is a possibility that the above described problem can be solved by appropriately designing a structure itself of the reflective display device.

DISCLOSURE OF THE INVENTION

An object of the present invention is to provide a display apparatus capable of realizing a suppression of display blur and a high display performance in combination.

According to the present invention, there is provided a display apparatus, comprising:

a pair of oppositely disposed substrates at least one of which is a transparent substrate, a display layer, disposed between the pair of substrates, for being placed in an optical state switchable between a light transmission state and a light interruption state, for each pixel unit, a reflection surface provided on one of the pair of substrates, a scattering layer disposed on the other substrate opposite to the substrate provided with the reflection surface, and a light absorption structure or a light reflection structure, disposed at a boundary portion between adjacent pixels on the substrate provided with the reflection surface.

These and other objects, features and advantages of the present invention will become more apparent upon a consideration of the following description of the preferred embodiments of the present invention taken in conjunction with the accompanying drawings.

Figure 5:
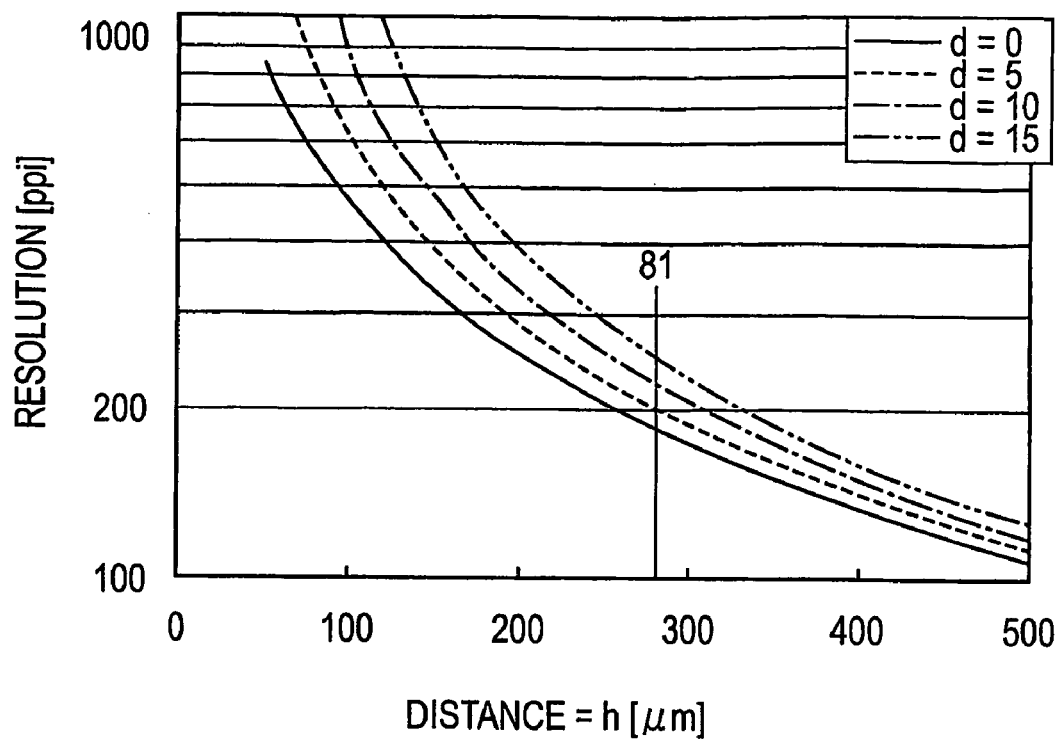
Figure 6:
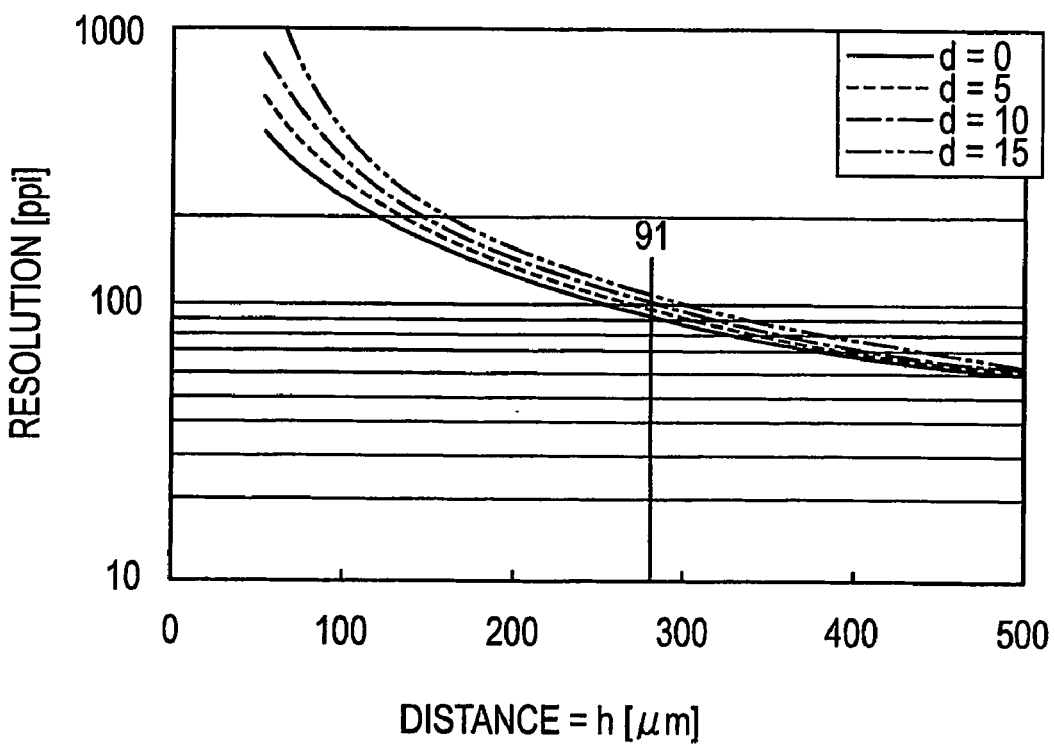
Figure 7:
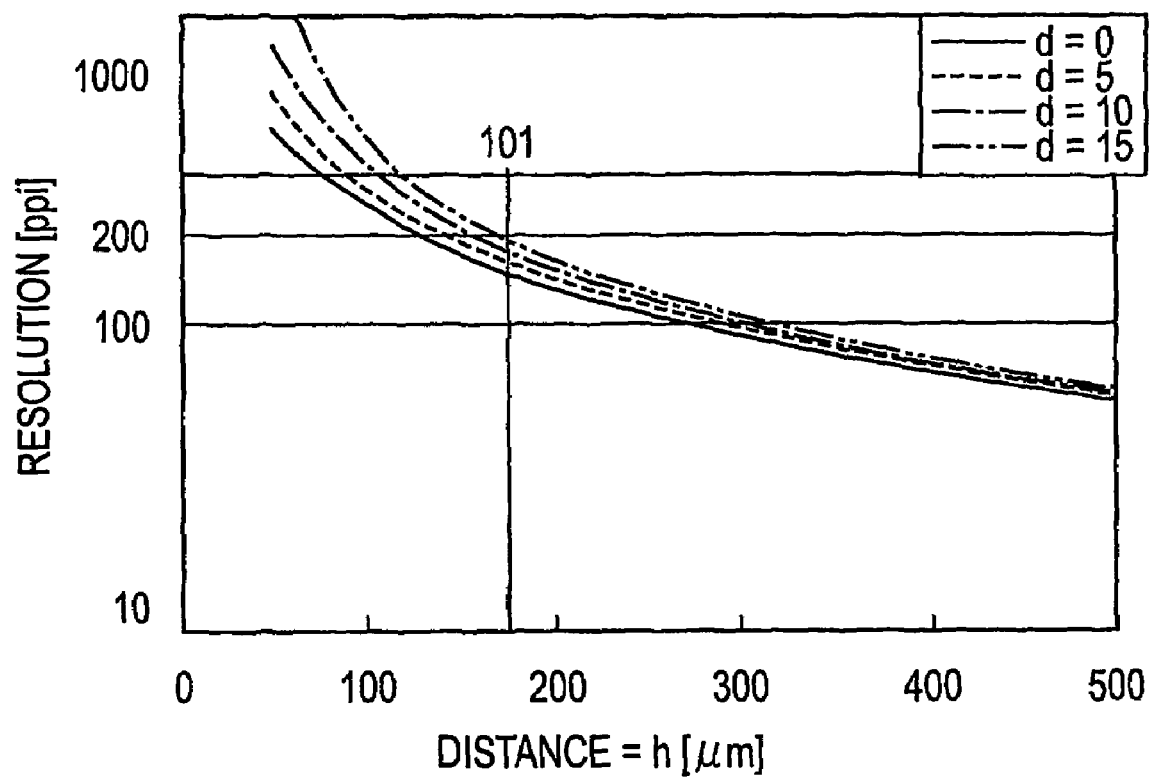

Each of FIGS. 5, 6 and 7 is a graph showing results of Example A appearing hereinafter.

Figure 8:
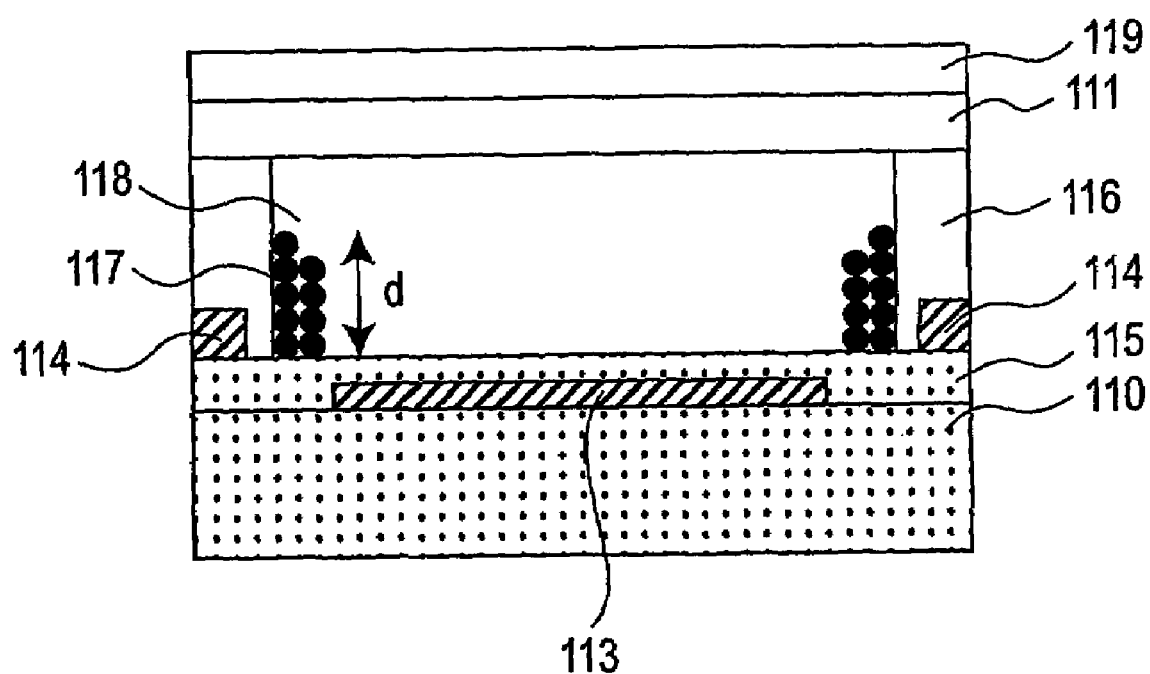

FIG. 8 is a schematic sectional view showing a structure of an electrophoretic display apparatus of the present invention used in Example B.

Figure 9:
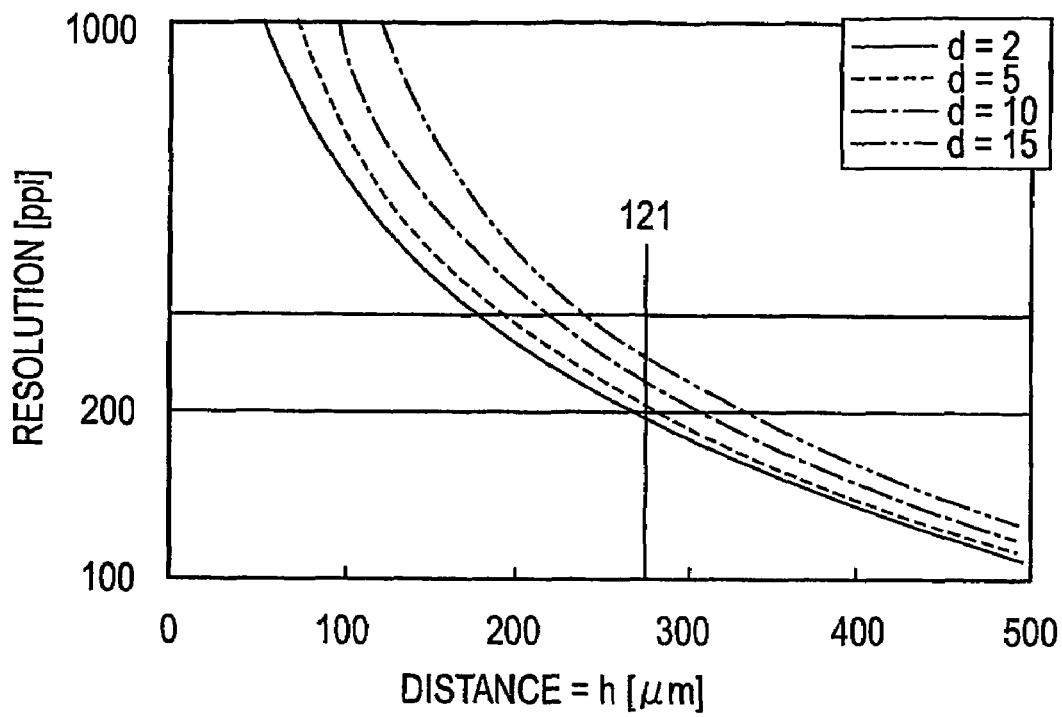
Figure 10:
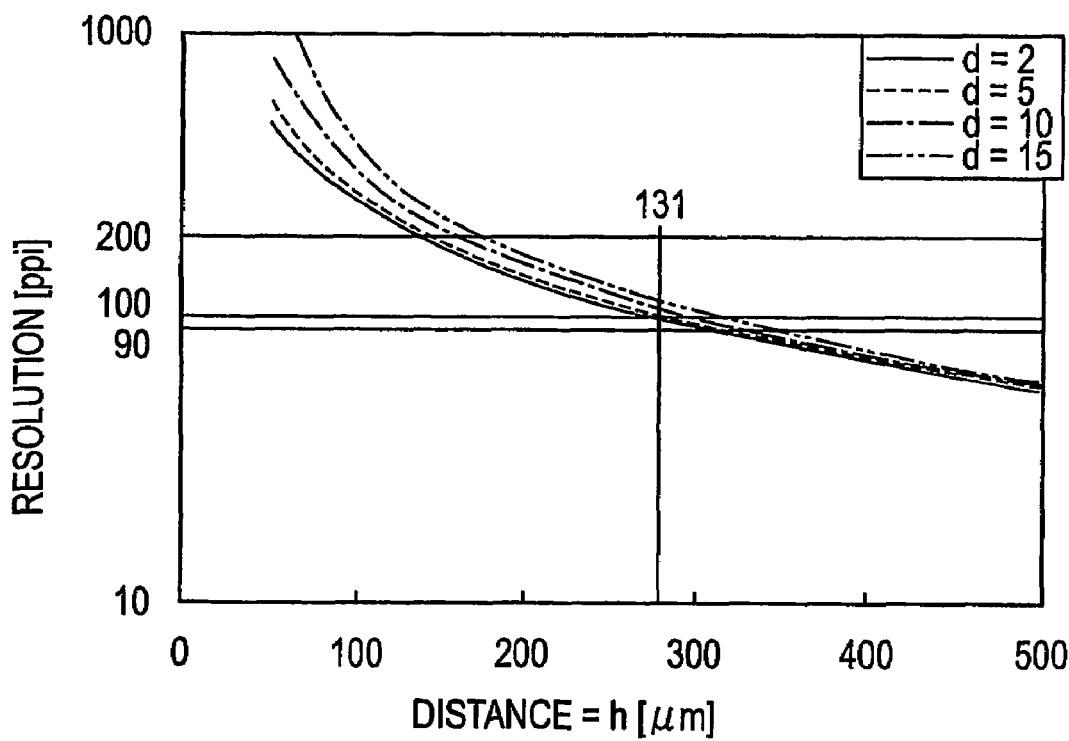
Figure 11:
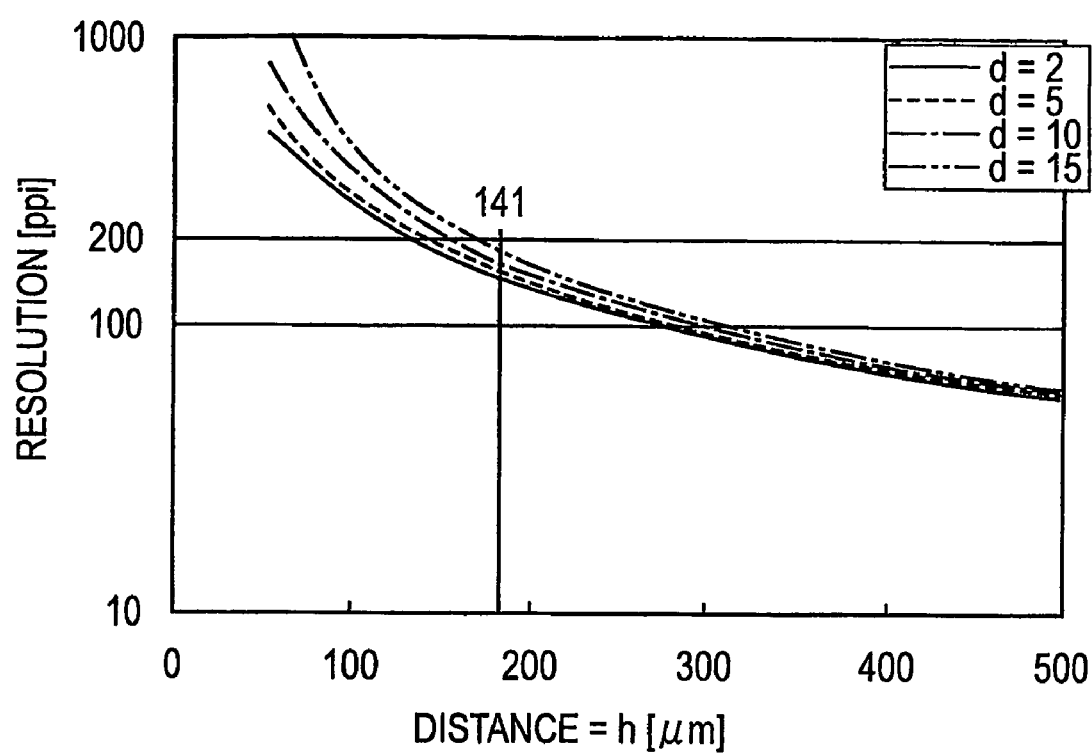

Each of FIGS. 9, 10 and 11 is a graph showing results of Example B.

Figure 12:
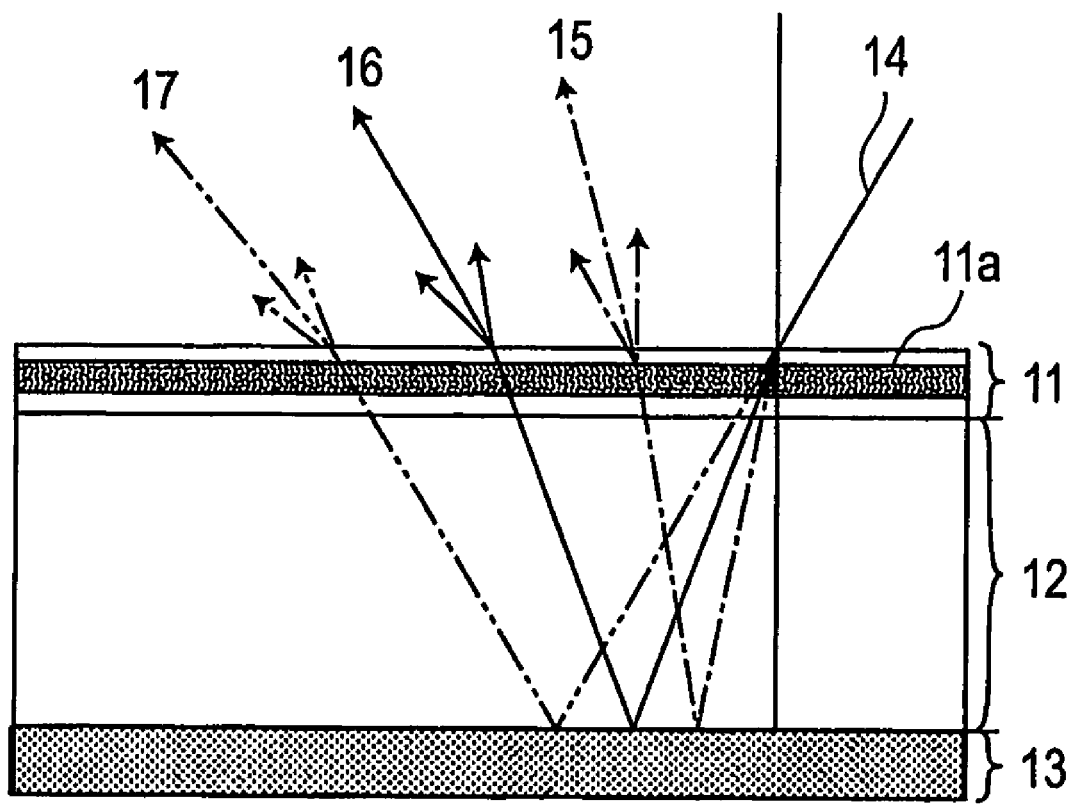
Figure 13:
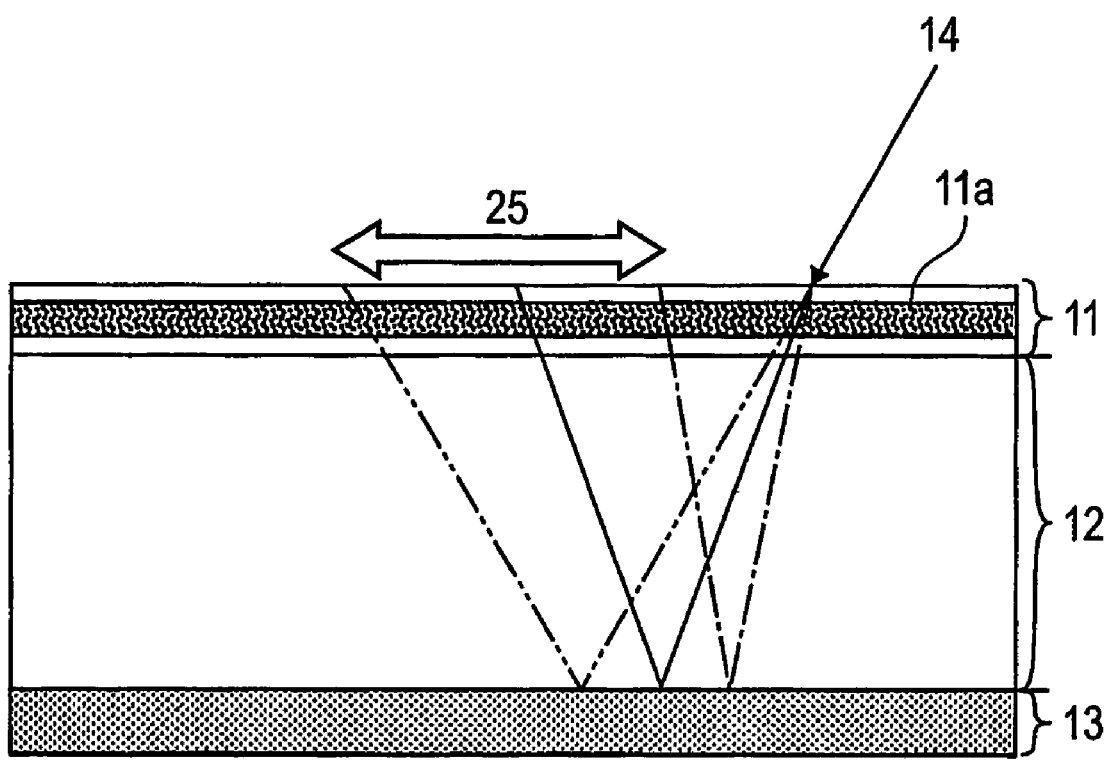
Figure 14:
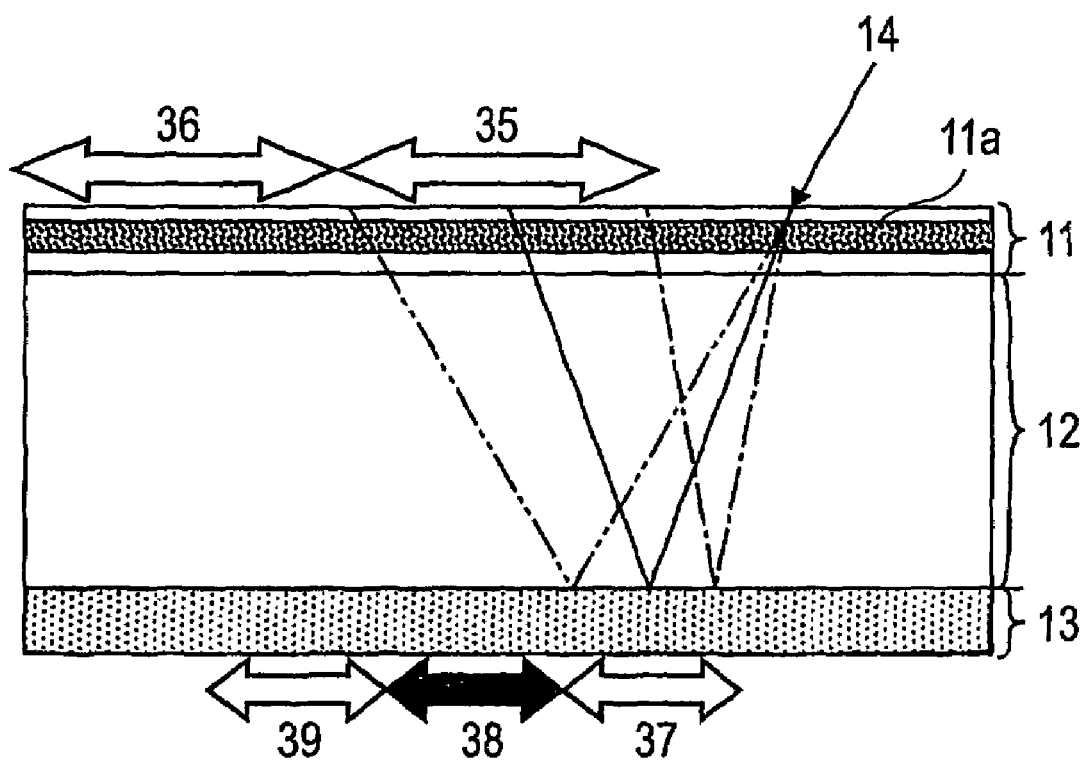

Each of FIGS. 12, 13 and 14 is a schematic sectional view for illustrating display blur occurring in a conventional reflective display apparatus.

BEST MODE FOR CARRYING OUT THE INVENTION

Hereinbelow, the present invention will be described more specifically with reference to the drawings.

Figure 1:
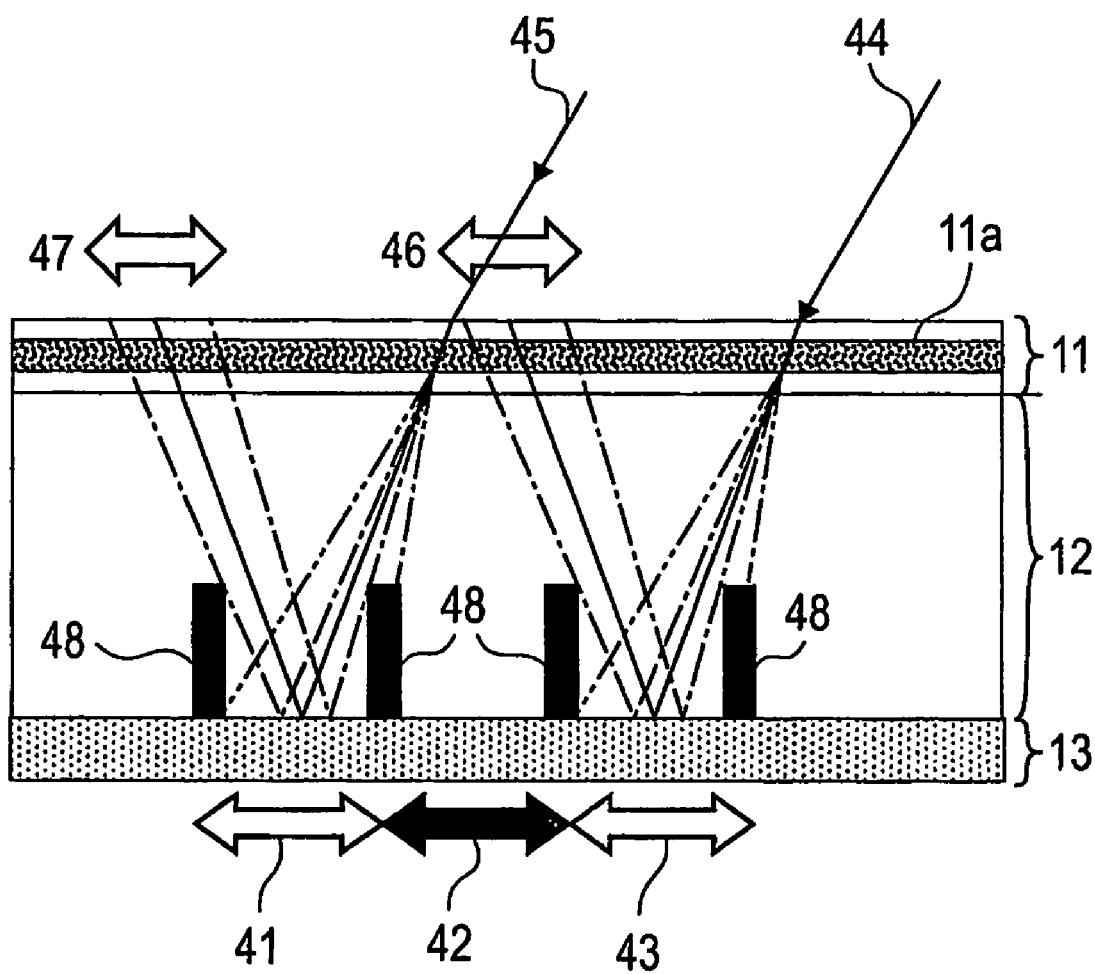
FIG. 1 is a schematic sectional view showing a structure of a reflective display apparatus according to the present invention.

FIG. 1 shows a structure of a reflective display apparatus according to an embodiment of the present invention.

In FIG. 1, the same reference numerals as in FIG. 12 are used for describing the same or corresponding members (means).

Referring to FIG. 1, a partition wall 48 which is a projection-like structure or a wall-like structure is disposed at a part of periphery of pixels corresponding to ranges 41, 42 and 43 indicated by double-pointed arrows, i.e., a boundary between adjacent pixels. The partition wall 48 has a light-absorbing function (property), so that it can absorb a part of light 44 which is emitted from a point source, enters a forward scattering plate 11 (forward scattering layer 11a), and is scattered by the forward scattering plate 11 (forward scattering layer 11a). As a result, the light after being reflected from a mirror reflection plate 13 and then reaching again the forward scattering plate 11 is only in a range 46 indicated by a double-pointed arrow.

Similarly, a part of light 45 which is emitted from a point source, enters a forward scattering plate 11 (forward scattering layer 11a), and is scattered by the forward scattering plate 11 (forward scattering layer 11a), is absorbed by the partition wall 48. As a result, the light after being reflected from a mirror reflection plate 13 and then reaching again the forward scattering plate 11 is only in a range 47 indicated by a double-pointed arrow.

In other words, by providing the partition wall 48, it is possible to avoid such circumstances that black display cannot be performed as in the conventional reflective display apparatus shown in FIG. 14 described above. Accordingly, as shown in FIG. 1, it becomes possible to effect clear black-and-white display. In this case, in order to obtain a clear white/black contrast by the use of the partition wall 48, it is preferable that the partition wall 48 has a light absorptance of not less than 60%.

As described above, it has been found out that display blur can be suppressed by providing a visible light-absorbing partition wall 48 at at least a portion of a peripheral area of pixel.

Figure 2:
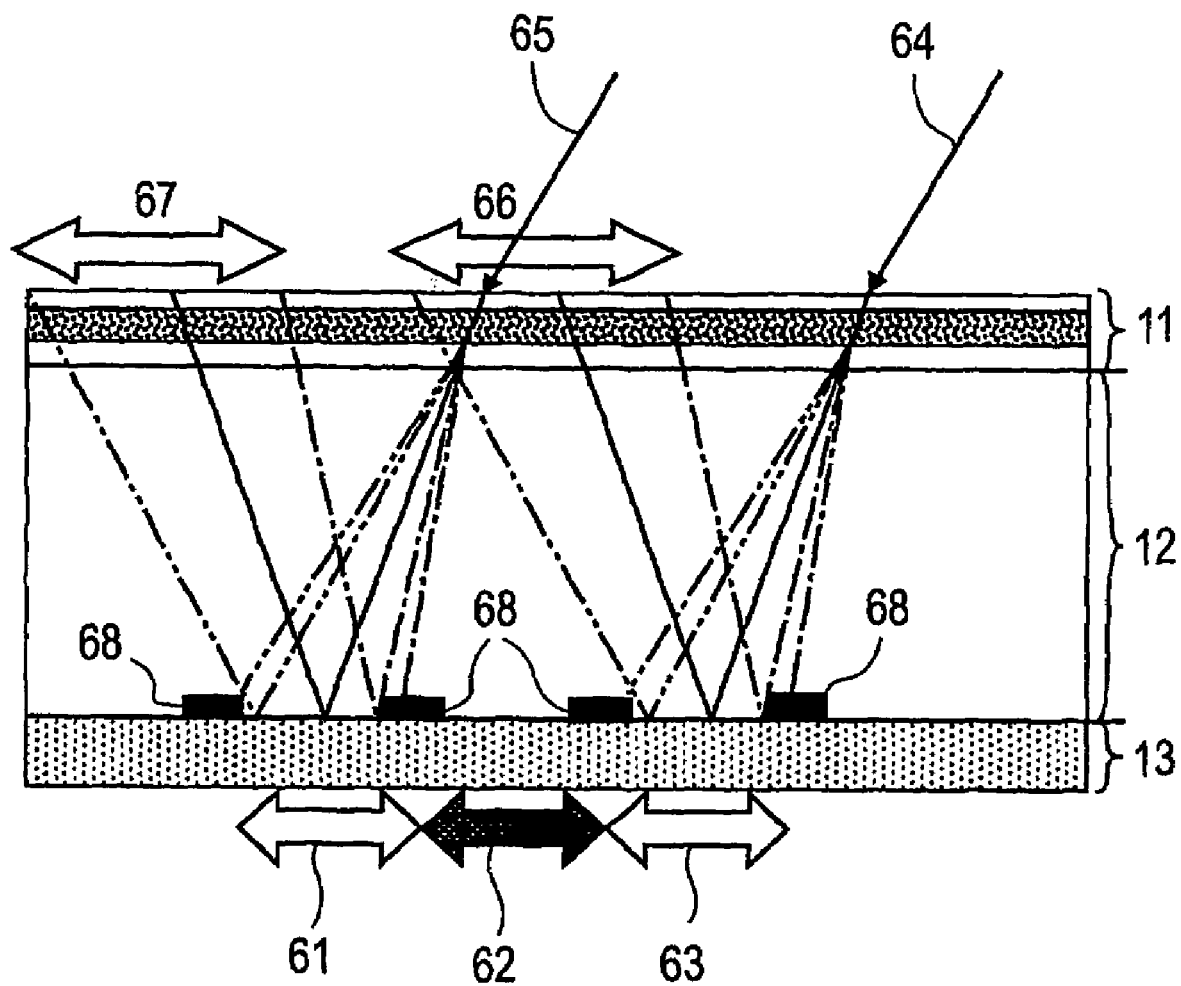
FIG. 2 is a schematic sectional view showing another structure of the reflective display apparatus of the present invention, wherein a light absorption area is provided on a reflection substrate side.

FIG. 2 shows another structure of the reflective display apparatus of the present invention, wherein the mirror reflection plate 13 is disposed and thereon, a black matrix (light-absorbing member) 68 providing a light-absorbing area is disposed at a peripheral portion of unit pixel in a corresponding area 61, 62 or 63 indicated by a double-pointed arrow on a side of an unshown substrate for reflecting light incident from the other unshown substrate provided with the forward scattering plate 11 (herein, this substrate is referred to a a "reflective substrate"), thus effecting light interruption at the peripheral portion of unit pixel.

Figure 3:
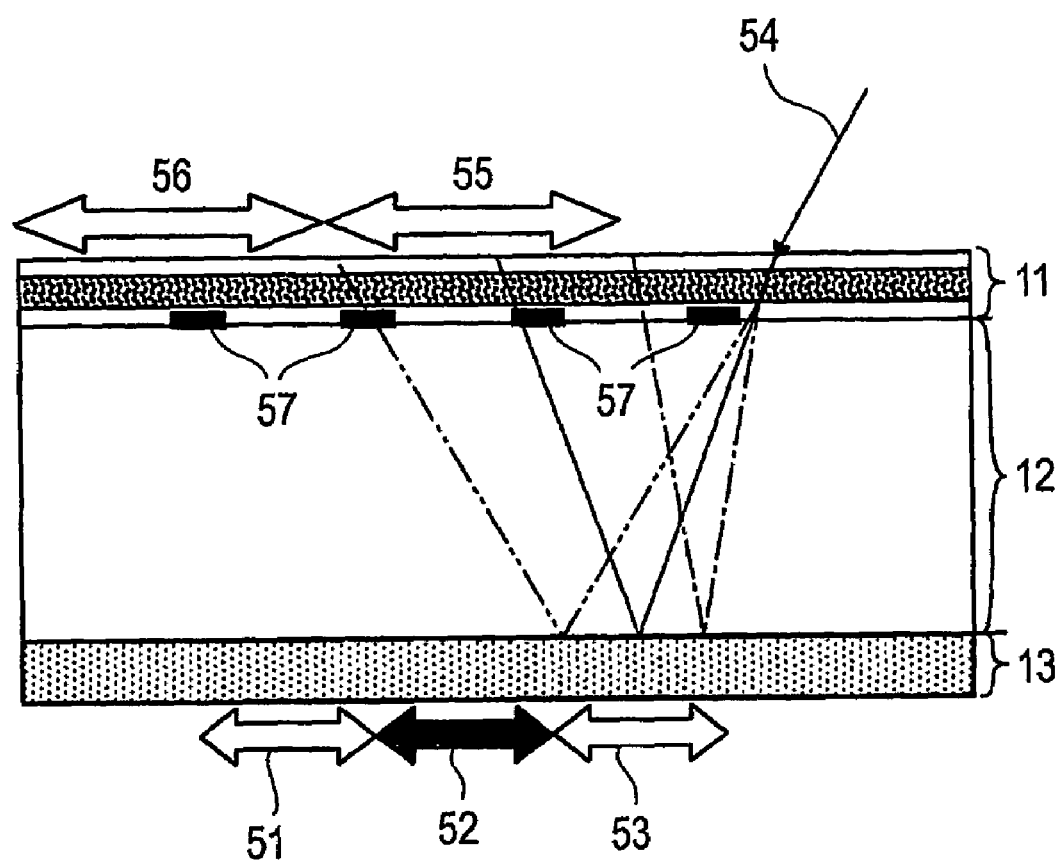
FIG. 3 is a schematic sectional view showing a comparative structure for the structure shown in FIG. 2, wherein a light absorption area is provided on a substrate side opposite from the reflective substrate side.

FIG. 3 shows a comparative structure for the reflective display apparatus shown in FIG. 2, wherein the forward scattering plate 11 is disposed and a black matrix (light interrupting member) 57 is disposed in a position corresponding to a peripheral portion of unit pixels in ranges 51 to 53 indicated by double-pointed arrows on an unshown substrate side (opposite substrate side) opposite to the reflective substrate side.

Referring to FIG. 2, in the case where the blackmatrix 68 is disposed on the reflective substrate side, of the pair of substrates, at the unit pixel periphery, the observer observes the ranges 66 and 67. On the other hand, in the case where the black matrix 57 is disposed on the opposite substrate side, similarly as in the case of the conventional reflective display apparatus shown in FIG. 14 described above, the black display state cannot be observed.

Accordingly, the black and white display states can be clearly discriminated by disposing the light-absorbing area (the black matrix 68) on the reflective substrate side at the unit pixel periphery rather than by disposing it on the opposite substrate side. Accordingly, it is effective and preferable that the partition wall 48 is disposed on the reflective substrate side even when it is disposed as shown in FIG. 1.

In the display apparatus of the present invention, as shown in FIGS. 1 and 2, on one of the pair of substrates on which light is incident, a scattering plate having a property of scattering incident light toward a light movement direction is disposed, and a light absorption or reflection structure having a projection-like or wall-like shape is disposed at least a portion of unit pixel periphery on the other substrate which selectively reflects the incident light from the one of substrates for each unit pixel. By disposing the scattering plate, it becomes possible to improve brightness by utilizing the reflection plate permitting mirror reflection or a high reflectance close thereto. At the same time, display blur is prevented by the light-absorbing (or light-reflective) structure, and thus clarity can be retained. As described above, by appropriately designing the structure itself of the display apparatus, it is possible to provide the reflective display apparatus which provides no display blur and a good display quality.

Next, parameters including a height, a pitch, etc., of the partition wall 48 capable of suppressing the display blur will be described with reference to FIG. 4. The partition wall 48 is in contact with the reflection substrate as described above.

Figure 4:
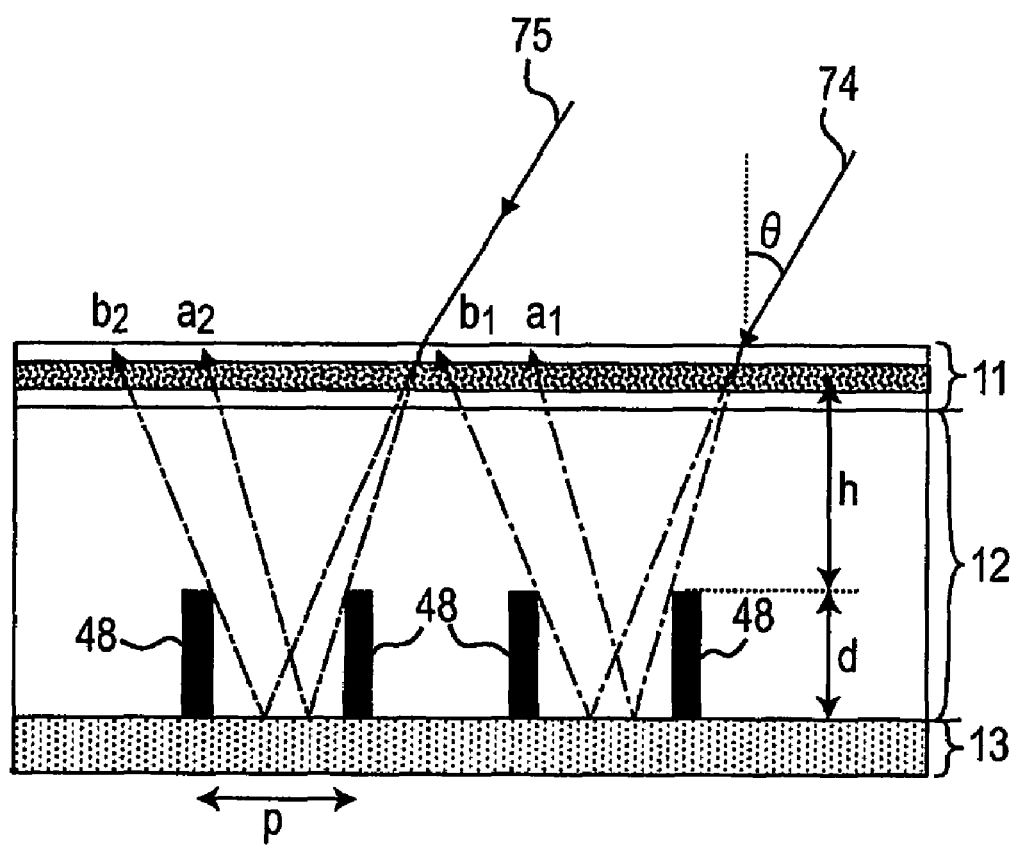
FIG. 4 is a schematic sectional view for illustrating parameters with respect to formation of a partition wall of the reflective display apparatus of the present invention.

In FIG. 4, $a_1$ represents a right end of an observable range of an observer by light 74 emitted from a point source, and $b_1$ represents a left end thereof. Similarly, $a_2$ represents a right end of the observable range by light 75 emitted from a point source, and $b_2$ represents a left end thereof.

In the case of such a condition that the left end $b_1$ and the right end $a_2$ change their positions, as described with reference to FIG. 14, the black display cannot be effected.

According to study of the present invention, it has been formed that display blur is not annoying when a distance between $b_1$ and $a_2$ is not less than ½ of a pixel pitch p. On the other hand, it has been also found that when the distance between $b_1$ and $a_2$ is about two times the pixel pitch p, a displayable range is considerably narrowed and a desired display state cannot be attained.

More specifically, it has been found that the display quality and the pixel pitch p have a close relationship. Further, according to study of the present inventor, it has been found that a desired display state is attained when the distance between $b_1$ and $a_2$ is not more than 1.5 times the pixel pitch p.

More, assuming that a height of the partition wall 48 having the high-absorbing property is d; a distance from the center of the front scattering layer 11a to the upper surface of the partition wall 48 is h; an (incident) angle, of incident lights 74 and 75, from a direction normal to the substrate is θ; a diffusion (scattering) angle T, of the forward scattering plate 11, defined as ½ of an angle at which an intensity of light transmitted through the scattering layer while being scattered in the scattering layer is ½ of an intensity of light transmitted through the scattering layer in a straight line is T; refractive indices of the forward scattering plate 11 and the display layer 12 are approximately equal to each other and are n, the following formula (1) is obtained through geometric calculation in view of these parameters and the above described conditions.

$$0.5p \geq \frac{3d\sin\theta'\cos\theta' - (2h+d)\sin\Theta'\cos\Theta'}{\cos^2\theta'\cos^2\Theta' - \sin^2\theta'\sin^2\Theta'} \geq -0.5p \quad (1)$$

$$\sin\theta' = \frac{\sin\theta}{n},$$

$$\cos\theta' = \frac{\sqrt{n^2 - \sin^2\theta}}{n},$$

$$\sin(\theta' + \Theta') = \frac{\sin(\theta + \Theta)}{n},$$

$$\cos(\theta' + \Theta') = \frac{\sqrt{n^2 - \sin^2(\theta + \Theta)}}{n}$$

By simplifying the above formula (1), the following formula is obtained.

$$0.5p \geq \left| \frac{3d\sin\theta'\cos\theta' - (2h+d)\sin\Theta'\cos\Theta'}{\cos^2\theta'\cos^2\Theta' - \sin^2\theta'\sin^2\Theta'} \right|$$

Herein, as the value of n, 1.5 which is considered to be that of an ordinary polymer is adopted. Further, as the incident angle θ, a value of 30 degrees is adopted in view of operation circumstances of the reflective display device used in the present invention. As a result, the following formula (2) is obtained.

$$\left| \frac{6\sqrt{2} \cdot d - 9 \cdot (2h+d)XY}{8Y^2 - X^2} \right| \leq 0.5p \quad (2)$$

$$X = \frac{1}{9}\left\{ 2\sqrt{2}\cos\Theta + 2\sqrt{6}\sin\Theta - \sqrt{9 - (\cos\Theta + \sqrt{3}\sin\Theta)^2} \right\},$$

$$Y = \frac{1}{9}\left\{ \cos\Theta + \sqrt{3}\sin\Theta + 2\sqrt{18 - 2\cdot(\cos\Theta + \sqrt{3}\sin\Theta)^2} \right\}$$

It is possible to expect that a desired display state free from edge blur can be obtained even in the case of using the forward scattering plate 111 by designing the device structure on the basis of the above formula (2).

In the present invention, display blur is suppressed by minimizing an amount of light ray, after being reflected from the mirror reflection plate 13, entering an adjacent pixel. Accordingly, in addition to disposition of the light-absorbing partition wall as described above, e.g., it is found that disposition of a light-reflective partition wall is also effective in suppressing display blur. In this case, the resultant display apparatus can be designed on the basis of the above described formula (2).

Further, even when a light transmission substance is used for the partition wall, in the case where the partition wall structure of the light transmission substance providing a refractive index higher than that of the display layer is used, a proportion of light rays, after being reflected from the mirror reflection plate, becoming total reflection light at the time of striking the partition wall, is increased. For this reason, the use of the light transmission substance in the partition wall structure is also effective in suppressing the display blur similarly as in the case of using the light-reflective partition wall structure. In this case, the designing of the display apparatus can be effected on the basis of the above formula (2).

As described above, the display blur can be suppressed by disposing the forward scattering plate 11 on the opposite substrate on which the light is incident and forming the light-absorbing or light-reflective partition wall 48 at least at a portion of unit pixel periphery. As a result, by appropriately designing the display device structure per se, it is possible to provide a reflective display device capable of providing a good display quality free from display blur.

Next, Examples A to D as embodiments of reflective display devices according to the present invention will be described.

EXAMPLE A

Three type of reflective liquid crystal devices as an embodiment of the reflective display apparatus of the present invention were prepared by forming a partition wall having a light-absorbing performance at a peripheral portion of unit pixel and by changing the cell thickness, the pixel pitch, the thickness of the opposite substrate, and the production process described later of the scattering layer leading to a change in scattering angle T. Thereafter, in each of the reflective liquid crystal devices, the height of partition wall was changed to prepare four sample devices, which were compared in terms of a display characteristic.

In this embodiment, common structure of the three reflective liquid crystal devices is as follows.

A liquid crystal layer was formed by injecting a liquid crystal material having a negative dielectric anisotropy ("MLC-6608", mfd. by Merck Co.) by capillary action into a cell comprising two glass plates which have been subjected to homeotropic alignment treatment and applied to each other. As a substrate structure, an active matrix (AM) cell was used. The AM cell included an AM substrate provided with a thin film transistor (TFT) as one of substrates (reflective substrate) and had a reflection type structure wherein an aluminum electrode was used as a pixel electrode on the TFT side.

On a substrate (opposite substrate) opposite to the TFT substrate (reflection substrate), a forward scattering plate comprising a 100 μm-thick base film of TAC (triacetyl cellulose) and a scattering layer formed thereon was disposed to enlarge a viewing angle.

At this time, as a degree of scattering, a scattering state of light transmitted through the forward scattering plate was measured by a goniophotometer (mfd. by Murakami Sikisai K.K.). In the present invention, a scattering angle T of the forward scattering plate was determined as a scattering angle at which the incident light provides a light intensity which is ½ of that of light linearly transmitted through the forward scattering plate without being not affected by the forward scattering plate.

As an alignment film, a 100 nm-thick film of an alignment material ("JALS 2022-R1", mfd. by JSR Corp.) was used. The alignment film was provided with a pretilt angle by rubbing the alignment film. The pretilt angle was about 0.5 degree from the direction normal to the substrate. Further, a polarizing plate provided with a wide-band λ/4 plate was laminated on the forward scattering plate, whereby the resultant AM cell has such a normal black structure that it is placed in a dark state under no voltage application and in a bright state under voltage application.

Further, a partition wall having a light-absorbing performance was disposed at a peripheral portion of unit pixel.

The partition wall was formed in the following manner.

First, on the TFT substrate, an acrylic photosensitive adhesive ("CFPR-016S", mfd. by Tokyo Ohka Kogyo K.K.) was spin-coated, prebaked at 80-90° C. for 180 sec., cooled to room temperature, and subjected to irradiation with ultraviolet (UV) ray (365 nm) at 200 mJ/cm² through a mask by using a super-high pressure mercury lamp.

Then, the photosensitive adhesive was developed for 20 sec. with a 5%-aqueous solution of triethanolamine, rinsed with pure water, and postbaked in a clean oven at 200° C. for 10 min., whereby a partition wall member having a line width of 5 μm and a rectangular cross section was formed at a peripheral portion of each pixel, i.e., at a spacing between respective electrodes arranged in a matrix.

Next, on the substrate provided with the partition wall member, a photocurable resin ("Black Color Mosaic CK 7000", mfd. by Fuji Hunt Co.) was applied in a thickness of 3 μm and dried at 85° C. for 15 min. The photocurable resin layer was exposed to light at 500 mJ/cm² through a photolithographic process using a high-pressure mercury lamp, and developed with a developer ("CD", mfd. by Fuji Hunt Co.).

As a result, a black pattern was formed only on the surface of the partition wall, and the black resin on other aluminum electrodes was completely removed. By this process, the partition wall having the light-absorbing property was disposed at the peripheral portion of electrodes arranged in a matrix.

The black resin portion had a visible ray absorptance of 98%, and a height d of the partition wall was $(d_k+3)$ μm, whereby $d_k$ represented a height of wall portion formed of the acrylic photosensitive resin.

Next, comparison of display characteristics of the three types of reflective liquid crystal devices prepared by changing the cell thickness, the pixel pitch, the thickness of the substrate opposite to the TFT substrate, and the scattering range T of the forward scattering plate will be explained. Evaluation of display quality was performed under an illumination condition used in a normal office environment.

(Reflective Liquid Crystal 1)

A reflective liquid crystal device device 1 used a substrate with a diagonal size of 5 inch (SVGA: 800×600 pixels) as an active matrix substrate. A resolution of the reflective liquid crystal device 1 was 200 pixels/inch, and a pixel pitch thereof was 127 μm. Further, a thickness of a liquid crystal layer as a display layer was 15 μm, and the above-described partition wall having light-absorbing performance was disposed on the TFT substrate at a peripheral portion of each pixel. A height d of the partition wall was set to 5 μm, 10 μm and 15 μm for three sample devices, respectively, by adjusting the above described value $d_k$. Further, a comparative sample device provided with no partition wall was also prepared.

As an opposite substrate, a 180 μm-thick glass substrate to which a forward scattering plate A was applied, was used. The forward scattering plate A showed a scattering angle T of 10 degrees. A total thickness of the glass substrate and the forward scattering plate A was 280 μm. Further, a distance h between the center of the scattering layer of the forward scattering plate A and the upper surface of the partition wall was 280 μm.

By using the above prepared four sample devices, display characteristics were compared when various displays were performed.

The results are shown in Table 1.

TABLE 1

| Device | Evaluation |
|---|---|
| d = 5 μm | Good*[1] |
| d = 10 μm | Very good*[2] |
| d = 15 μm | Very good*[2] |
| d = 0 μm (comparative) | Poor*[3] |

*[1]"Good" represents such a state that substantially no display blur occurred and a good display was performed.
*[2]"Very good" represents such a state no display blur occurred and a good display was performed.
*[3]"Poor" represents such a state that considerable display blur occurred. Particularly, a clear contrast was not attained since a black portion became paler when a black line was displayed on a white background.

FIG. 5 is a graph showing a relationship between a maximum resolution (derived according to the above described formula (2)) and a distance h between the center of scattering layer of forward scattering plate A and the upper surface of partition wall. In FIG. 5, each of points of intersection of a straight line 81 corresponding to the distance h of 280 μm and four curves of the four sample devices having different heights d (=0 μm, 5 μm, 10 μm, 15 μm) represents a maximum resolution corresponding to the thickness of the glass substrate in this example. As shown in FIG. 5, in the case of the comparative sample device provided with no partition wall (d=0 μm), an available maximum resolution is 180 ppi (pixels per inch). On the other hand, in the case of other three sample devices provided with the partition walls having the heights of not less than 5 μm, an available maximum resolution is not less than 200 ppi.

Accordingly, it has been found that it becomes possible to obtain a good display state by designing the device structure so as to satisfy the above described formula (2).

(Reflective Liquid Crystal 2

A reflective liquid crystal device device 2 used a substrate with a diagonal size of 10 inch (SVGA: 800×600 pixels) as an active matrix substrate. A resolution of the reflective liquid crystal device 1 was 100 pixels/inch, and a pixel pitch thereof was 254 μm. Further, a thickness of a liquid crystal layer was 15 μm, and the above-described partition wall having light-absorbing performance was disposed on the TFT substrate at a peripheral portion of each pixel. A and 15 μm for three sample devices, respectively, by adjusting the above described value $d_k$. Further, a comparative sample device provided with no partition wall was also prepared.

As an opposite substrate, a 180 μm-thick glass substrate to which a forward scattering plate B was applied, was used. The forward scattering plate B showed a scattering angle T of 20 degrees. A total thickness of the glass substrate and the forward scattering plate B was 280 μm. Further, a distance h between the center of the scattering layer of the forward scattering plate B and the upper surface of the partition wall was 280 μm.

By using the above prepared four sample devices, display characteristics were compared when various displays were performed.

The results are shown in Table 2.

TABLE 2

| Device | Evaluation |
|---|---|
| d = 5 μm | Good*[1] |
| d = 10 μm | Very good*[2] |
| d = 15 μm | Very good*[2] |
| d = 0 μm (comparative) | Poor*[3] |

*[1]"Good" represents such a state that substantially no display blur occurred and a good display was performed.
*[2]"Very good" represents such a state no display blur occurred and a good display was performed.
*[3]"Poor" represents such a state that considerable display blur occurred. Particularly, a clear contrast was not attained since a black portion became paler when a black line was displayed on a white background.

FIG. 6 is a graph showing a relationship between a maximum resolution (derived according to the above described formula (2)) and a distance h between the center of scattering layer of forward scattering plate B and the upper surface of partition wall. In FIG. 6, each of points of intersection of a straight line 91 corresponding to the distance h of 280 μm and four curves of the four sample devices having different heights d (=0 μm, 5 μm, 10 μm, 15 μm) represents a maximum resolution corresponding to the thickness of the glass substrate in this example. As shown in FIG. 6, in the case of the comparative sample device provided with no partition wall (d=0 μm), an available maximum resolution is 96 ppi (pixels per inch). On the other hand, in the case of other three sample devices provided with the partition walls having the heights of not less than 5 μm, an available maximum resolution is not less than 100 ppi.

Accordingly, it has been found that it becomes possible to obtain a good display state by designing the device structure so as to satisfy the above described formula (2).

The calculation for deriving the formula (2) was performed on the assumption that an (incident) angle θ of light from the light source set to 30 degrees from the direction normal to the substrate. On the other hand, when the calculation was performed on the assumption that the angle θ was set to other values, it was confirmed that the results inconsistent with those in this embodiment were attained. In other words, it was confirmed that the setting of the incident light θ of 30 degrees was appropriate.

(Reflective Liquid Crystal 3)

A reflective liquid crystal device device 3 used a substrate with a diagonal size of 7.5 inch (SVGA: 800×600 pixels) as an active matrix substrate. A resolution of the reflective liquid crystal device 1 was 150 pixels/inch, and a pixel pitch thereof was 191 μm. Further, a thickness of a liquid crystal layer as a display layer was 15 μm, and the above-described partition wall having light-absorbing performance was disposed on the TFT substrate at a peripheral portion of each pixel. A height d of the partition wall was set to 5 μm, 10 μm and 15 μm for three sample devices, respectively, by adjusting the above described value $d_k$. Further, a comparative sample device provided with no partition wall was also prepared.

As an opposite substrate, a 80 μm-thick glass substrate to which a forward scattering plate B was applied, was used. The forward scattering plate B showed a scattering angle T of 20 degrees. A total thickness of the glass substrate and the forward scattering plate B was 180 μm. Further, a distance h between the center of the scattering layer of the forward scattering plate B and the upper surface of the partition wall was 180 μm.

By using the above prepared four sample devices, display characteristics were compared when various displays were performed.

The results are shown in Table 3.

TABLE 3

| Device | Evaluation |
|---|---|
| d = 5 μm | Good*[1] |
| d = 10 μm | Very good*[2] |
| d = 15 μm | Very good*[2] |
| d = 0 μm (comparative) | Poor*[3] |

*[1]"Good" represents such a state that substantially no display blur occurred and a good display was performed.
*[2]"Very good" represents such a state no display blur occurred and a good display was performed.
*[3]"Poor" represents such a state that considerable display blur occurred. Particularly, a clear contrast was not attained since a black portion became paler when a black line was displayed on a white background.

FIG. 7 is a graph showing a relationship between a maximum resolution (derived according to the above described formula (2)) and a distance h between the center of scattering layer of forward scattering plate B and the upper surface of partition wall. In FIG. 7, each of points of intersection of a straight line 101 corresponding to the distance h of 180 μm and four curves of the four sample devices having different heights d (=0 μm, 5 μm, 10 μm, 15 μm) represents a maximum resolution corresponding to the thickness of the glass substrate in this example. As shown in FIG. 7, in the case of the comparative sample device provided with no partition wall (d=0 μm), an available maximum resolution is 145 ppi (pixels per inch). On the other hand, in the case of other three sample devices provided with the partition walls having the heights of not less than 5 μm, an available maximum resolution is not less than 150 ppi.

Accordingly, it has been found that it becomes possible to obtain a good display state by designing the device structure so as to satisfy the above described formula (2).

EXAMPLE B

In this embodiment, three type of electrophoretic display devices as another embodiment of the reflective display apparatus of the present invention were prepared by changing the pixel pitch, the thickness of opposite substrate, and the production process of the scattering layer leading to a change in scattering angle T. Thereafter, in each of the electrophoretic display devices, the height of partition wall was changed to prepare four sample devices, which were compared in terms of a display characteristic.

FIG. 8 is a schematic sectional view showing the electrophoretic display device. As shown in FIG. 8, the electrophoretic display device includes a first substrate (reflective substrate) 110, an insulating layer 115 which is colorless and transparent and is formed of polyimide on the first substrate 110, and a first electrode 113 which is formed of aluminum under the insulating layer 115 and is connected with an unshown switching device such as a thin film transistor (TFT). The first electrode has a planar area corresponding to an area defined by a partition wall member 116.

On the other hand, on the upper surface of the insulating layer 115, a second electrode 114 and the partition wall member 116 are formed. In a space defined by the partition wall member 116, a dispersion liquid in which black charged particles 117 of polystyrene resin containing carbon black are dispersed in an insulating liquid 118 principally comprising a paraffin-based hydrocarbon solvent is filled. On a second substrate (opposite substrate) 111, a forward scattering plate 119 is disposed so as to enlarge a viewing angle.

In this embodiment, a common structure of the three electrophoretic display devices is as follows.

As a substrate structure, an active matrix (AM) cell was used. The transparent second substrate 111 and the partition wall member 116 were fixed with an adhesive. As a material for the partition wall member 116, an epoxy type photosensitive resin was used, and the adhesive was an ultraviolet (UV) curable adhesive. On the second substrate 111, the forward scattering plate 119 comprising a 100 μm-thick base film of TAC (triacetyl cellulose) and a scattering layer formed thereon was disposed to enlarge the viewing angle.

At this time, as a degree of scattering, a scattering state of light transmitted through the forward scattering plate 119 was measured by a goniophotometer (mfd. by Murakami Sikisai K.K.). In the present invention, a scattering angle T of the forward scattering plate 119 was determined as a scattering angle at which the incident light provides a light intensity which is ½ of that of light linearly transmitted through the forward scattering plate 119 without being not affected by the forward scattering plate 119.

The electrophoretic display device effects black-and-white display by applying a voltage between the first electrode 113 and the second electrode 114. Further, it is also possible to effect gradational display by appropriately controlling an amplitude of voltage signal to be applied and/or time of application of voltage to be applied to the first and second electrode 113 and 114.

For example, at the time of white display, the charged particles 117 are present on the surface of the partition wall member at the pixel peripheral portion as shown in FIG. 8, and at the time of black display, the charged particles are uniformly dispersed over the first electrode 113 to provide such a light imperviousness state that the incident light does not reach the reflection plate 115. As a result, it is possible to attain a contrast between bright and dark states. Further, it is found that during such a white display, a height d of deposition of the black particles at the surface of the partition wall varies depending on a shape and a height of the second electrode 114 and a size of the charged particles 117.

Next, comparison of display characteristics of three electrophoretic display devices prepared by changing a pixel pitch, a thickness of opposite substrate and a scattering angle T of the forward scattering plate will be described. Evaluation of display quality is effected under an illumination condition in a normal office environment.

(Electrophoretic Display Device 1)

A electrophoretic display device 1 used a substrate with a diagonal size of 5 inch (SVGA: 800×600 pixels) as an active matrix substrate. A resolution of the reflective liquid crystal device 1 was 200 pixels/inch, and a pixel pitch thereof was 127 μm. Further, a thickness of an electrophoretic display layer as a display layer was 15 μm, and a deposition height of black particles deposited along the partition wall disposed at a peripheral portion of each pixel during white display was adjusted to 2 μm, 5 μm, 10 μm and 15 μm for four sample devices, respectively.

As a second substrate 111, a 180 μm-thick glass substrate to which a forward scattering plate A was applied, was used. The forward scattering plate A showed a scattering angle T of 10 degrees. A total thickness of the glass substrate and the forward scattering plate A was 280 μm. Further, a distance h between the center of the scattering layer of the forward scattering plate A and the upper surface of the partition wall was 280 μm.

By using the above prepared four sample devices, display characteristics were compared when various displays were performed.

The results are shown in Table 4.

TABLE 4

| Device | Evaluation |
|---|---|
| d = 2 μm | Poor[*1] |
| d = 5 μm | Good[*2] |
| d = 10 μm | Very good[*3] |
| d = 15 μm | Very good[*3] |

[*1]"Poor" represents such a state that display blur occurred to some extent.
[*2]"Good" represents such a state that substantially no display blur occurred and a good display was performed.
[*3]"Very good" represents such a state no display blur occurred and a good display was performed.

FIG. 9 is a graph showing a relationship between a maximum resolution (derived according to the above described formula (2)) and a distance h between the center of scattering layer of forward scattering plate A and the upper surface of partition wall. In FIG. 9, each of points of intersection of a straight line 121 corresponding to the distance h of 280 μm and four curves of the four sample devices having different deposition heights d (=2 μm, 5 μm, 10 μm, 15 μm) represents a maximum resolution corresponding to the thickness of the glass substrate in this example. As shown in FIG. 9, in the case of the comparative sample device having a lower deposition height (d=2 μm) of black particles, an available maximum resolution is 190 ppi (pixels per inch). On the other hand, in the case of other three sample devices containing black particles having the deposition heights of not less than 5 μm, i.e., in the case of other three sample devices wherein a light-absorbing partition wall member having a height of not less than 5 μm was formed of the black particles, an available maximum resolution is not less than 200 ppi.

Accordingly, it has been found that it becomes possible to obtain a good display state by designing the device structure so as to satisfy the above described formula (2).

(Electrophoretic Display Device 2)

A electrophoretic display device 2 used a substrate with a diagonal size of 10 inch (SVGA: 800×600 pixels) as an active matrix substrate. A resolution of the reflective liquid crystal device 1 was 100 pixels/inch, and a pixel pitch thereof was 254 µm. Further, a thickness of an electrophoretic display layer as a display layer was 15 µm, and a deposition height of black particles deposited along the partition wall disposed at a peripheral portion of each pixel during white display was adjusted to 2 µm, 5 µm, 10 µm and 15 µm for four sample devices, respectively.

As a second substrate 111, a 180 µm-thick glass substrate to which a forward scattering plate B was applied, was used. The forward scattering plate B showed a scattering angle T of 20 degrees. A total thickness of the glass substrate and the forward scattering plate B was 280 µm. Further, a distance h between the center of the scattering layer of the forward scattering plate B and the upper surface of the partition wall was 280 µm.

By using the above prepared four sample devices, display characteristics were compared when various displays were performed.

The results are shown in Table 5.

TABLE 5

| Device | Evaluation |
| --- | --- |
| d = 2 µm | Poor*[1] |
| d = 5 µm | Good*[2] |
| d = 10 µm | Very good*[3] |
| d = 15 µm | Very good*[3] |

*[1]"Poor" represents such a state that display blur occurred. Particularly, a clear contrast was not attained since a black portion became paler when a black line was displayed on a white background.
*[2]"Good" represents such a state that substantially no display blur occurred and a good display was performed.
*[3]"Very good" represents such a state no display blur occurred and a good display was performed.

FIG. 10 is a graph showing a relationship between a maximum resolution (derived according to the above described formula (2)) and a distance h between the center of scattering layer of forward scattering plate A and the upper surface of partition wall. In FIG. 10, each of points of intersection of a straight line 131 corresponding to the distance h of 280 µm and four curves of the four sample devices having different deposition heights d (=2 µm, 5 µm, 10 µm, 15 µm) represents a maximum resolution corresponding to the thickness of the glass substrate in this example. As shown in FIG. 10, in the case of the comparative sample device having a lower deposition height (d=2 µm) of black particles, an available maximum resolution is 190 ppi (pixels per inch). On the other hand, in the case of other three sample devices containing black particles having the deposition heights of not less than 5 µm, i.e., in the case of other three sample devices wherein a light-absorbing partition wall member having a height of not less than 5 µm was formed of the black particles, an available maximum resolution is not less than 100 ppi.

Accordingly, it has been found that it becomes possible to obtain a good display state by designing the device structure so as to satisfy the above described formula (2).

(Electrophoretic Display Device 3)

A electrophoretic display device 1 used a substrate with a diagonal size of 7.5 inch (SVGA: 800×600 pixels) as an active matrix substrate. A resolution of the reflective liquid crystal device 1 was 150 pixels/inch, and a pixel pitch thereof was 191 µm. Further, a thickness of an electrophoretic display layer as a display layer was 15 µm, and a deposition height of black particles deposited along the partition wall disposed at a peripheral portion of each pixel during white display was adjusted to 2 µm, 5 µm, 10 µm and 15 µm for four sample devices, respectively.

As a second substrate 111, a 80 µm-thick glass substrate to which a forward scattering plate B was applied, was used. The forward scattering plate B showed a scattering angle T of 20 degrees. A total thickness of the glass substrate and the forward scattering plate B was 180 µm. Further, a distance h between the center of the scattering layer of the forward scattering plate B and the upper surface of the partition wall was 180 µm.

By using the above prepared four sample devices, display characteristics were compared when various displays were performed.

The results are shown in Table 6.

TABLE 6

| Device | Evaluation |
| --- | --- |
| d = 2 µm | Poor*[1] |
| d = 5 µm | Good*[2] |
| d = 10 µm | Very good*[3] |
| d = 15 µm | Very good*[3] |

*[1]"Poor" represents such a state that display blur occurred. Particularly, a clear contrast was not attained since a black portion became paler when a black line was displayed on a white background.
*[2]"Good" represents such a state that substantially no display blur occurred and a good display was performed.
*[3]"Very good" represents such a state no display blur occurred and a good display was performed.

FIG. 11 is a graph showing a relationship between a maximum resolution (derived according to the above described formula (2)) and a distance h between the center of scattering layer of forward scattering plate A and the upper surface of partition wall. In FIG. 11, each of points of intersection of a straight line 141 corresponding to the distance h of 180 µm and four curves of the four sample devices having different deposition heights d (=2 µm, 5 µm, 10 µm, 15 µm) represents a maximum resolution corresponding to the thickness of the glass substrate in this example. As shown in FIG. 11, in the case of the comparative sample device having a lower deposition height (d=2 µm) of black particles, an available maximum resolution is 149 ppi (pixels per inch). On the other hand, in the case of other three sample devices containing black particles having the deposition heights of not less than 5 µm, i.e., in the case of other three sample devices wherein a light-absorbing partition wall member having a height of not less than 5 µm was formed of the black particles, an available maximum resolution is not less than 150 ppi.

Accordingly, it has been found that it becomes possible to obtain a good display state by designing the device structure so as to satisfy the above described formula (2).

Further, with respect to the electrophoretic display devices 1 to 3, when the sample devices having the black particles deposition height of less than 5 µm were compared with each other, the sample device for the electrophoretic display device 1 providing the highest maximum resolution based a lowest degree of display blur. Accordingly, it was confirmed that the display blur was effectively alleviated by effecting display at a resolution of not less than 200 ppi.

In this embodiment B, the electrophoretic display device in which the charged particles were dispersed in liquid was used. However, it is also possible to other display devices of various display schemes including a particle movement-type display device in which particles are dispersed in gas and a dielectric migration-type display device using particles which are not electrically charged.

EXAMPLE C

A reflective liquid crystal device provided with a partition wall having a visible light reflectiveness disposed at a peripheral portion of pixel was prepared.

The partition wall was formed in the following manner.

On a TFT substrate, an acrylic photosensitive adhesive ("CFPR-016R", mfd. by Tokyo Ohka Kogyo K.K.) was spin-coated, prebaked at 80-90° C. for 180 sec., cooled to room temperature, and subjected to irradiation with ultraviolet ray (365 nm) at 200 mJ/cm² through a mask by using a super-high pressure mercury lamp.

Then, the photosensitive adhesive was developed for 20 sec., with a 5%-aqueous solution of triethanolamine, rinsed with pure water, and postbaked in a clean oven at 200° C. for 10 min., whereby a partition wall member having a line width of 5 μm and a rectangular cross section was formed at a peripheral portion of each pixel, i.e., at a spacing between respective electrodes arranged in a matrix.

Next, on the above-treated substrate on which the partition wall was formed, an aluminum layer was selectively formed only at the partition wall portion by a lift-off method. As a result, the partition wall having the visible light reflectiveness was disposed at the peripheral portion of the matrix-arranged electrodes.

With respect to the thus prepared reflective liquid crystal device, a plurality of sample devices having different partition wall heights d were prepared and subjected to evaluation of display quality under an illumination condition in a standard office environment.

As a result, it was confirmed that a degree of display blur was improved by disposing the visible light reflective partition wall. Further, it was also confirmed that the degree of display blur was remarkably improved in the case of using the partition wall having a height of not less than 5 μm.

EXAMPLE D

A reflective liquid crystal device provided with a partition wall, having an outermost surface formed of a high refractive index substance, disposed at a peripheral portion of pixel was prepared.

The partition wall was formed in the following manner.

On a TFT substrate, an acrylic photosensitive adhesive ("CFPR-016R", mfd. by Tokyo Ohka Kogyo K.K.) was spin-coated, prebaked at 80-90° C. for 180 sec., cooled to room temperature, and subjected to irradiation with ultraviolet ray (365 nm) at 200 mJ/cm² through a mask by using a super-high pressure mercury lamp.

Then, the photosensitive adhesive was developed for 20 sec., with a 5%-aqueous solution of triethanolamine, rinsed with pure water, and postbaked in a clean oven at 200° C. for 10 min., whereby a partition wall member having a line width of 5 μm and a rectangular cross section was formed at a peripheral portion of each pixel, i.e., at a spacing between respective electrodes arranged in a matrix.

Next, on the above-treated substrate on which the partition wall was formed, an ITO (indium tin oxide) layer was selectively formed only at the partition wall portion by a lift-off method. The ITO layer showed a refractive index of 2.0.

A liquid crystal material (MLC-6608) used in this embodiment provided an ordinary (refractive) index of 1.4756 and an extraordinary index of 1.5586, so that the refractive index of the partition wall portion was larger than that of the liquid crystal layer (display layer). In other words, a refractive index $n_w$ of the partition wall and a refractive index $n_d$ of the liquid crystal layer as a layer of display medium were set to satisfy the relationship of: $n_w > n_d$. As a result, the partition wall comprising the material providing a relatively higher refractive index them the liquid crystal layer was formed at the peripheral portion of electrodes arranged in the matrix.

With respect to the thus prepared reflective liquid crystal device, a plurality of sample devices having different partition wall heights d were prepared and subjected to evaluation of display quality under an illumination condition in a standard office environment.

As a result, it was confirmed that a degree of display blur was improved by disposing the visible light reflective partition wall. Further, it was also confirmed that the degree of display blur was remarkably improved in the case of using the partition wall having a height of not less than 5 μm.

Incidentally, in Example A, the light-absorbing partition wall was prepared by forming a black pattern on the partition wall surface. However, it is also possible to form a partition wall per se with a light-absorbing substance as the light-absorbing partition wall.

Further, by using such a display mode that a light-absorbing substance in the form of particle is concentrated in the pixel peripheral area or in the vicinity of wall surface present in the pixel periphery by an external field such as an electric field, at least a part of the partition wall can be covered with the light-absorbing substance in such a state that the liquid crystal layer (display layer) substantially provides a light transmission state. Particularly, in the case of employing such a mode utilizing the concentration of particle-like substance by the electric field, it is not necessary to use the light-absorbing substance as a material for the partition wall itself. For this reason, the display mode may suitably used from the viewpoint of simplification of production process.

Similarly, instead of formation of the light-absorbing substance, it is possible to utilize light-reflective particles by selectively forming an aluminum layer only at the partition wall portion. Further, instead of formation of the partition wall having a higher refractive index them the display layer, it is also possible to utilize high refractive index particles by selectively forming an ITO (indium tin oxide) layer only at the partition wall portion.

Further, the above described partition walls, having, e.g., the light-absorbing property, disposed at the periphery of pixel may be present around the entire periphery of unit pixel or may be effective even when they are disposed only at a part of the pixel periphery. In the latter case, when the shape of the unit pixel is a rectangular shape having different sides, the arrangement of partition wall along the long side is effective.

In the case where a direction of display image is preliminarily determined when the reflective display apparatus according to the present invention is actually used, the partition wall disposed below the unit pixel. More specifically, in the case where information of the display apparatus is viewed in a normal posture, the display apparatus is illuminated with sunlight outdoors or light of illumination lamp indoors, from above. Accordingly, in order to suppress display information blur affecting adjacent pixels, the arrangement of partition wall at least on the lower side of the periphery of unit pixel.

While the invention has been described with reference to the structures disclosed herein, it is not confined to the details set forth and this application is intended to cover such modifications or changes as may come within the purposes of the improvements or the scope of the following claims.

INDUSTRIAL APPLICABILITY

According to the present invention, it is possible to provide a display apparatus capable of realizing a suppression of display blur and a high display performance in combination by appropriately designing a structure of a reflective display device.

The invention claimed is:

1. A display apparatus, comprising:
   first and second oppositely disposed substrates, at least one of which is a transparent substrate,
   a display layer, disposed between said first and second substrates, for being placed in an optical state switchable between a light transmission state and a light interruption state, for each of a plurality of pixel units,
   a reflection surface provided on said first substrate,
   a scattering layer disposed on said second substrate opposite to said first substrate, and
   a structure disposed at a boundary portion between adjacent pixels on said first substrate,
   said structure being a light absorption structure absorbing not less than 60% of incident light.

2. An apparatus according to claim 1, wherein said structure is a projection or a wall.

3. An apparatus according to claim 1, wherein the following relationship is satisfied:

$$\left| \frac{6\sqrt{2} \cdot d - 9 \cdot (2h + d)XY}{8Y^2 - X^2} \right| \leq 0.5p$$

$$X = \frac{1}{9} \left\{ 2\sqrt{2} \cos\theta + 2\sqrt{6} \sin\theta - \sqrt{9 - (\cos\theta + \sqrt{3}\sin\theta)^2} \right\},$$

$$Y = \frac{1}{9} \left\{ \cos\theta + \sqrt{3}\sin\theta + 2\sqrt{18 - 2 \cdot (\cos\theta + \sqrt{3}\sin\theta)^2} \right\},$$

wherein d represents a height of said structure, p represents a pixel pitch, h represents a distance between said scattering layer and said structure, and T represents a scattering angle defined as ½ of an angle at which an intensity of light transmitted through said scattering layer while being scattered in said scattering layer is ½ of an intensity of light transmitted through said scattering layer in a straight line.

4. An apparatus according to claim 3, wherein the height d of said structure is not less than 5 μm.

5. An apparatus according to claim 1, wherein each pixel has a rectangular shape, and said structure is disposed at a boundary portion between adjacent pixels along at least a long side of a rectangular pixel.

6. An apparatus according to claim 1, wherein each pixel has a rectangular shape having a side located at its lower portion during image formation, and said structure is disposed along said side.

7. An apparatus according to claim 1, wherein said structure has a refractive index $n_w$ which is larger than a refractive index $n_d$ of said display layer.

8. An apparatus according to claim 1, wherein said display layer is a liquid crystal layer.

9. An apparatus according to claim 1, wherein said display layer comprises light absorbing charged particles and a liquid for dispersing the charged particles therein.

10. An apparatus according to claim 9, wherein said display layer is partitioned by a partition wall for each pixel, and when said display layer is in a light transmission state, said structure is formed of the charged particles which are deposited along the partition wall.

11. An apparatus according to claim 1, wherein said apparatus has a resolution of not less than 200 pixels per inch.

* * * * *

UNITED STATES PATENT AND TRADEMARK OFFICE
CERTIFICATE OF CORRECTION

PATENT NO.        : 7,423,711 B2
APPLICATION NO.   : 10/552578
DATED             : September 9, 2008
INVENTOR(S)       : Yasufumi Asao It is certified that error appears in the above-identified patent and that said Letters Patent is hereby corrected as shown below:

COLUMN 2:

Line 30, "shinning" should read --shining--.
Line 35, "shinning" should read --shining--.
Line 40, "shinning" should read --shining--.

COLUMN 4:

Line 29, "to a" should read --to as--.

COLUMN 6:

Line 57, "type" should read --types--.

COLUMN 8:

Line 14, "crystal device" should read --crystal--.
Line 50, "state" should read --state that--.

COLUMN 9:

Line 43, "state" should read --state that--.

COLUMN 10:

Line 44, "state" should read --state that--.

COLUMN 11:

Line 3, "type" should read --types--.

COLUMN 12:

Line 43, "state" should read --state that--.

COLUMN 13:

Line 36, "state" should read --state that--.

UNITED STATES PATENT AND TRADEMARK OFFICE
CERTIFICATE OF CORRECTION

PATENT NO. : 7,423,711 B2
APPLICATION NO. : 10/552578
DATED : September 9, 2008
INVENTOR(S) : Yasufumi Asao It is certified that error appears in the above-identified patent and that said Letters Patent is hereby corrected as shown below:

<u>COLUMN 14</u>:

Line 30, "state" should read --state that--.

<u>COLUMN 16</u>:

Line 35, "may" should read --may be--.
Line 41, "them" should read --than--.

Signed and Sealed this

Twelfth Day of May, 2009

JOHN DOLL
*Acting Director of the United States Patent and Trademark Office*